350-376 SR 4029 D 4P SEARCH ROOM
XR 3,475,738 CROSS REFERENCE

Oct. 28, 1969 H. P. LOUIS ET AL 3,475,738
MAGNETO-OPTICAL DATA STORAGE
Filed May 26, 1966 2 Sheets-Sheet 1

INVENTORS
HELMUT P. LOUIS
SIEGFRIED METHFESSEL
BY Charles P. Boberg
ATTORNEY

PRIOR ART 3,475,738

MAGNETO-OPTICAL DATA STORAGE

Helmut P. Louis, Burlington, Vt., and Siegfried Methfessel, Montrose, N.Y., assignors to International Business Machines Corporation, Armonk, N.Y., a corporation of New York Filed May 26, 1966, Ser. No. 553,174
Int. Cl. G11b 5/00; G02f 1/22
U.S. Cl. 340—174 7 Claims

ABSTRACT OF THE DISCLOSURE

The ability of a light-beam addressable memory element to rotate the polarization plane of the interrogating light beam is greatly enhanced by utilizing a ferromagnetic type of magneto-optical medium (such as a europium chalcogenide) which is in magnetically exchange-coupled relationship with the associated data storage medium, e.g., permalloy. Magnetic exchange coupling involves the use of thin ferromagnetic layers in which the magnetization vectors of the respective layers at each bit storage position are pointed in the same direction parallel with the surfaces of the layers, the particular direction indicating whether the stored bit is 1 to 0, and the portion of each layer within the bit storing spot exhibiting single-domain behavior.

This invention relates to magneto-optical data storage devices such as may be employed in light-beam addressable memories and the like.

At the present time a great deal of attention is being given to the development of memory systems wherein data can be stored magnetically and read out optically. In apparatus of this type a magneto-optical medium is selectively magnetized at various points therein to represent stored data, and during readout operations selected portions of this medium are impinged or "addressed" by a linearly polarized light beam. If any portion of the medium addressed by such a light beam is locally magnetized in a particular manner, the polarization plane of the light beam will undergo an angular shift or rotation indicative of the stored datum represented by such local magnetization. These polarization shifts are detected to furnish sense signals corresponding to the stored data.

When the polarization plane of a linearly polarized light beam undergoes rotation while the beam is passing through a transparent, magnetized magneto-optical medium, this is known as the "Faraday" magneto-optical effect. When a polarized light beam undergoes rotation of its polarization plane as the result of being reflected from the surface of a magnetized magneto-optical medium, this is known as the "Kerr" magneto-optical effect. The Faraday effect and the Kerr effect are different manifestations of the same basic phenomenon, namely, magneto-optical activity, which involves a change in the refraction index due to the magnetic state of the material. This phenomenon manifests itself in the reflection of light as the Kerr effect, and in the transmission of light as the Faraday effect.

There are different types of Kerr effects according to the various directions along which the medium can be magnetized with respect to the reflecting surface and the direction of the light beam. One type of Kerr effect that is of particular importance in the present instance is the longitudinal Kerr effect, which occurs when a polarized light beam is reflected from the surface of a medium that is magnetized parallel to its surface and in the plane of incidence of the light beam. In all of these magneto-optical effects the extent and the sense of the optical rotation depend upon the magnetic state of the medium impinged by the beam.

As employed herein, the term "magneto-optical medium" denotes a magnetic material which, when magnetized, has the ability to change the polarization state of transmitted or reflected light as a function of its magnetization. To be ideally suited for use in a system where data are to be stored magnetically and read out optically, a magneto-optical medium should have certain desirable properties not all of which can be found in any one material at the present time. For magnetic storage purposes, an ideal magneto-optical medium should have high remanent magnetization, fairly low coercivity (one or two oersteds for some applications; in the order of 100 oersteds for others), a high ratio of remanent flux density to saturation flux density (square-loop hysteresis characteristic) and low creep tendencies. For good optical readout properties, the magneto-optical medium should be able to impart a significant angular shift to the polarization plane of the light beam (sufficient to be detected by practical means) without requiring unduly large magnetization. If the Faraday effect is to be utilized, the medium should be transparent to the polarized light beam. In many instances the Faraday effect is preferred because it produces greater rotation than can be obtained by the Kerr effect. At the present time the foregoing magnetic and optical properties cannot be realized in any one material. The magnetic requirements can readily be met by known ferromagnetic materials, especially metals such as nickel-iron alloy (permalloy) or ferrite materials, but such materials are incapable of providing a substantial Kerr effect, and if they are made thin enough to be transparent, they do not provide a substantial Faraday rotation.

There have been various proposals to enhance the Kerr rotational effect by coating a ferromagnetic storage medium with, for example, a layer of transparent, insulating, diamagnetic material, which tends to enhance the Kerr effect of the storage medium by an optical interference action. It has been proposed also to coat a ferromagnetic storage medium with a transparent paramagnetic medium (for example, cerium glass) that is coupled magnetostatically (i.e., by stray magnetic fields) to the magnetized portions of the storage medium. Neither of these methods has been particularly successful in providing Kerr rotational effects of practical magnitude for information storage and readout purposes.

An object of the present invention is to provide an improved type of magneto-optical data storage device which combines high storage capability with good magneto-optical readout properties.

A further object is to combine a magnetic storage medium with a magneto-optical medium in such a way as to provide a practical magneto-optical information storage means.

The present invention is based upon the discovery that when a light-reflecting body of high-remanence ferromagnetic metal such as permalloy is covered with a layer of transparent, ferromagnetic, semiconducting material (a rare-earth chalcogenide, for example) under conditions such that these two layers are in a magnetically exchange-coupled relationship to each other, the resulting magneto-optical structure is capable of exhibiting a polarization shift which is substantially greater than can be obtained from any prior magneto-optical storage device.

As used herein, the term "ferromagnetic" is applied to any material in which atomic magnetic moments generated by electron spins and electron orbits are oriented in parallel relationships within well-defined domains or nucleation sites. For present purposes the term is broad enough to include what are known as "ferrimagnetic" materials (such as rare-earth iron garnets), wherein the respective magnetizations of various domains or layers of the material may be generated by an anti-parallel relationship of two magnetic substructures, provided the material is at a temperature such that the magnetization of one magnetic substructure dominates that of the other. It should be understood, of course, that the term "ferromagnetic" does not apply to a material in which there is a completely random orientation of the magnetic moments without any well-defined domain structure, such as may exist in "paramagnetic" materials at ordinary temperatures or which may exist even in a nominally ferromagnetic material if its temperature is above the "Curie temperature" of that material. To be ferromagnetic, the material must be capable of exhibiting a spontaneous net magnetization under quiescent conditions. Magnetic hysteresis is a characteristic property of such materials.

The foregoing and other objects, features and advantages of the invention will be apparent from the following more particular description of a preferred embodiment of the invention, as illustrated in the accompanying drawings.

Figure 1:
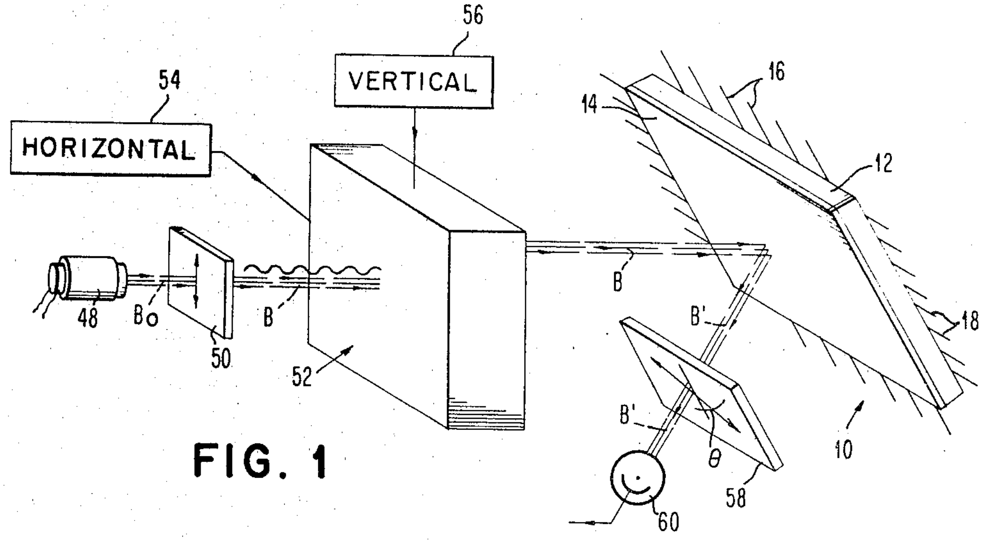
FIG. 1 is a perspective, partially schematic view showing a type of magneto-optical data storage apparatus in which the present invention can be embodied.

FIG. 1 is a simplified showing of a light-beam addressable memory system in which the present invention may be embodied. The magneto-optical storage apparatus proper is generally designated 10 in this figure. The apparatus 10 comprises a two-layer magneto-optical storage medium including a data storage layer 12 and a magneto-optical layer 14. The storage layer 12 is a sheet or film of ferromagnetic material, preferably (though not necessarily) comprising a ferromagnetic metal such as nickel-iron alloy (permalloy) which has a light-reflecting surface. The light reflecting surface of the storage layer 12 is covered by the transparent magneto-optical layer 14, the properties of which will be described presently. Associated with the storage film 12 is an array of orthogonally related coordinate conductors 16 and 18, respectively, which are adapted to be coincidentally energized in selected combinations to store magnetic data representations at storage positions respectively defined by the crossover points of the conductors 16 and 18. The specific mode of operation whereby the medium 12 is selectively magnetized to represent stored digital data is well known for the case where 12 is a nickel-iron (Ni-Fe) film with a uniaxial anisotropy of magnetization, or a combination of such films. At each bit storage position (defined by a crossover point between a conductor 16 and a conductor 18) the medium 12 has a remanent magnetization directed one way or the other along its preferred or "easy" axis to represent a binary "one" bit or a binary "zero" bit.

In accordance with the present invention, the magneto-optical medium 14 is formed of a transparent ferromagnetic semiconductor that is capable, when magnetized, of imparting a certain angular displacement or rotation to the polarization plane of a linearly polarized light beam B transmitted through it. The layer 14 may be composed, for example, of a rare-earth chalcogenide such as europium oxide (EuO), europium sulfide (EuS), europium selenide (EuSe), or europium telluride (EuTe). The medium 14 must, of course, be maintained at a temperature below its Curie point in order to exhibit ferromagnetic properties. It is conceivable also that the magneto-optical layer 14 can be composed of a ferrimagnetic material, provided such a material is employed at an ambient temperature that differs substantially from its magnetic compensation temperature and is substantially below its Curie point so that the material is capable of exhibiting a spontaneous net magnetization. Certain rare-earth iron garnets (such as gadolinium iron garnet, for example) are in this class of ferrimagnetic materials.

Figure 2:
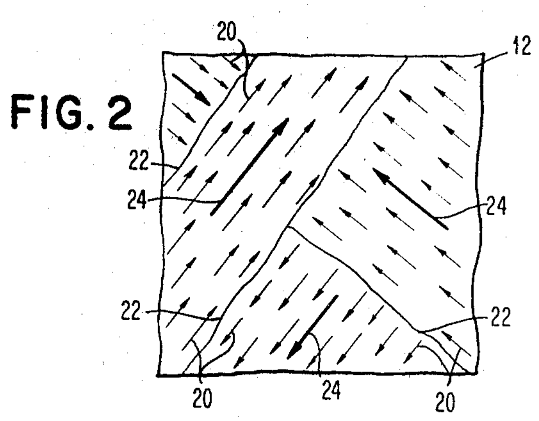
FIG. 2 is a diagrammatic representation of a ferromagnetic material in a demagnetized state, the same being characterized by a random orientation of the constituent magnetic domains.

Before proceeding further with the description of the system shown in FIG. 1, it will be explained in greater detail what is meant herein by the term "ferromagnetic." In a material having magnetic properties, atomic magnetic moments are generated by electron spins and electron orbital motions. In a ferromagnetic material the atomic magnetic moments have a tendency, when the material is below its Curie temperature, to assume parallel alignments within certain microscopic portions of the material known as "domains" or "nucleation sites." FIG. 2 represents, on an exaggerated scale, the various alignments of the atomic magnetic moments 20 within their respective domains (defined by the domain walls 22) in a ferromagnetic material 12 such as permalloy, for example, when the same is in a demagnetized state. The effective magnetization of each domain is indicated in FIG. 2 by a large arrow 24, which represents the cumulative effect of the aligned atomic moments 20 within the respective domain. When the ferromagnetic material is in a demagnetized state, the various domains thereof are randomly oriented, as indicated in FIG. 2, and their effective magnetizations cancel one another so that the net magnetization of the unmagnetized sample is zero.

Figure 3:
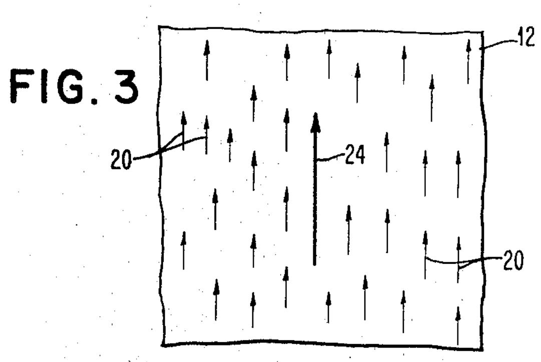
FIG. 3 is a diagrammatic representation of a ferromagnetic material in a magnetized state, wherein it behaves essentially as a single magnetic domain.

FIG. 3 represents on an exaggerated scale the situation which exists within a given bit storage area of the ferromagnetic medium 12 when it is in a magnetized state. In this instance all of the atomic moments 20 within said area are oriented in substantially parallel relationship with each other, causing the body of ferromagnetic material within that area to behave essentially as though it consisted of a single magnetic domain, the resultant magnetization of which is represented by the large arrow 24. The domain walls 22 of FIG. 2 disappear when the material is unidirectionally magnetized as shown in FIG. 3, and such domain walls do not form again unless the material for some reason or other commences to lose its unidirectional magnetization.

For present purposes attention will be given only to those types of magnetization in which the magnetic moments are directed substantially parallel to the surface of the storage medium. Other possible types of magnetization will not be specifically considered herein because they are not directly involved in the mode of operation which is hereinafter described as an example.

Figure 4:
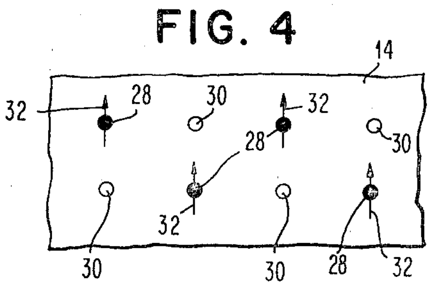
FIG. 4 is a diagram representing the molecular structure and magnetic behavior of a ferromagnetic semiconductor such as europium oxide while the same is in a magnetized state.

In a magneto-optical medium 14, FIG. 1, comprising a ferromagnetic semiconductive material such as one of the europium chalcogenides, the molecular structure may be represented as shown in FIG. 4, wherein the solid circles 28 represent europium atoms (or, to be more precise, europium ions) and the open circles 30 represent the atoms or ions of the chalcogen (such as oxygen, for example). Each of the europium atoms 28 has a magnetic moment 32, and if the temperature of the material is well below its Curie temperature (e.g., 72° K. for europium oxide), the magnetic moments 32 will tend to assume a parallel relationship with each other, at least within the boundaries of each domain. The chalcogen atoms 30 contribute no magnetic moments to the resultant magnetization.

The essential advantage of using a ferromagnetic semiconductor for the magneto-optical layer 14, instead of a ferromagnetic metal layer capable of transmitting light, is that the semiconductor has relatively low optical absorption for light of certain wavelengths. This will be explained in greater detail hereinafter. The optical activity that takes place within the transparent layer 14 is a Faraday rotational effect, since the layer 14 is transmitting light rather than reflecting it. The optical activity which takes place at the light-reflecting surface of the metallic layer 12 is a Kerr rotational effect. As explained hereinabove, the Kerr effect is a phenomenon related to the Faraday effect wherein the light penetrates a molecularly thin surface layer of the reflecting material before being reflected out again, and in the course of its passage through this thin layer of the reflecting material the polarization plane of the light is shifted slightly.

As shown in FIG. 1, the magneto-optical storage device 10 is adapted to be addressed during readout operations by a linearly polarized light beam B, which is selectively directed (by means hereinafter described) so that it impinges upon a particular bit-storage area of the magnetic storage medium 12 at the desired address or location thereon. In so doing, of course, the beam B passes through the transparent magneto-optical medium 14. Then after being reflected by the surface of medium 12, the light passes again through the medium 14 (assumed for the present to be a europium chalcogenide) and emerges as the beam B′, which for practical purposes can be regarded as a linearly polarized light beam whose plane of polarization is angularly related to the polarization plane of the incident light beam B. The crystalline structure of the medium 14 is such that the europium atoms tend to be in a divalent ionized state (represented by the symbol $Eu^{++}$), and these europium ions will tend to rotate the polarization plane of a linearly polarized light beam which is transmitted through the medium 14. The angualr direction of such rotation depends upon the particular orientation of the magnetic moments 32. If these moments 32 are randomly oriented, as may occur if the temperature of the material rises above its Curie point and there is no alignment of the atomic magnetic moments by an applied magnetic filed, then the medium 14 will have no net rotational effect upon the light beam as it passes through the medium 14, except for changes in the polarization state by reflections at the surfaces and by internal stresses as usually observed in transparent media. If the portion of the medium 14 transmitting the light beam is unidirectionally magnetized, however, then the polarization plane of the light beam may undergo an angular shift or rotation in passing through the medium 14.

In addition to having the necessary optical rotating properties, the magneto-optical medium 14 should have low reflectance (at low or moderate angles of incidence) and low absorption of optical energy. Although medium 14 must be ferromagnetic and can exhibit some hysteresis, it need not have a rectangular hysteresis loop such as the one shown in FIG. 5, which depicts the response-excitation characteristic of the storage medium 12.

Figure 5:
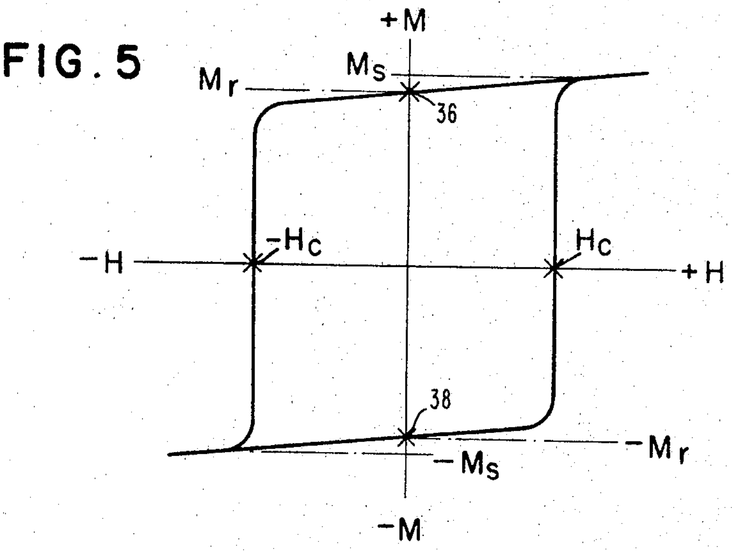
FIG. 5 is a hysteresis loop graphically representing a typical response-excitation characteristic of a ferromagnetic material having good information storage properties.

As just indicated, FIG. 5 is a hysteresis curve for a ferromagnetic material of a type suitable for storing digital data, such material being employed in the storage medium 12, FIG. 1. FIG. 5 shows the relationship between the magnetization M and the field or magnetizing force H which is applied along a given axis of the ferromagnetic material defined by the magnetic anisotropies of the material as the preferred or "easy" axis of magnetization. In its quiescent state, with zero applied excitation, the material may be in a stable state of limiting remanent magnetization $M_r$ designated by the point 36, or it may be in the opposite stable state of limiting remanent magnetization, $-M_r$, designated by point 38 on the curve. The two points 36 and 38 represent opposite directions of remanent magnetization along the easy axis of the ferromagnetic material. For convenience, these two conditions may be called the "positive" stable state and the "negative" stable state, respectively. It is possible for a ferromagnetic material also to have other stable states of lesser remanent magnetization, or no remanent magnetization, but for present purposes attention will be given only to the two limiting remanent states respectively denoted by the points 36 and 38, FIG. 5.

If the applied field H varies positively from zero to a maximum value substantially exceeding the coercive force $H_C$ of the ferromagnetic material and then returns to zero, the magnetization M of the storage medium will be brought first to a positive saturation level at $M_s$; then it will subside slightly to a state of positive remanent magnetization $M_r$ at point 36. If the applied field H varies negatively from zero to a maximum value exceeding the coercive force $-H_C$ and then back to zero, the magnetization of the storage medium will be brought first to the negative saturation level $-M_s$; then it will return to a state of negative remanent magnetization $-M_r$ denoted by point 38. As described thus far, it has been assumed that the storage medium is operated in a manner such that it is subjected only to alternating applied fields which are directed along its easy axis, under which conditions the magnetization of the material changes by a process known as domain-wall switching or domain-wall motion. FIG. 5 graphically illustrates this type of operation.

Under practical operating conditions it is preferred to change the magnetization of a ferromagnetic storage film by a process known as orthogonal-field switching or rotational switching. In this mode of operation a transverse field is applied momentarily along a so-called "hard axis" of the material (at right angles to the easy axis thereof) in order to rotate all of the magnetic moments such as 20 and 24, FIG. 3, temporarily into a direction at right angles to the easy axis. Then, shortly prior to the termination of this transverse field, another field is applied in a selected direction parallel to the easy axis, this latter field continuing for a limited time after the transverse field terminates, thereby causing the magnetic moments of the material to be rotated into the desired easy-axis direction. By selective energization of the coordinate array conductors 16 and 18, FIG. 1, this orthogonal-field type of a switching operation is performed for magnetically recording or "writing" digital information into the ferromagnetic storage medium 12.

To be ideally suited for storing digital information, a ferromagnetic storage medium should have the following properties:

1. A high-value of remnant magnetization $M_r$.
2. A high ratio of remanent magnetization $M_r$ to the magnetization $M_s$ which the material exhibits while in its saturation state, giving the curve a "square-kneed" appearance as shown in FIG. 5.
3. A coercive force $H_C$ which is not too high (1 or 2 oersteds in magnetic thin films; on the order of 100 oersteds in magnetic tapes).
4. Low creep tendencies, that is, a low sensitivity to disturbances caused by stray magnetic fields or by half-select current pulses in the array lines.

In the present state of the art, a ferromagnetic material which exhibits all of the foregoing properties does not itself have the additional ability to rotate the polarization plane of a light beam through a significantly large angle; hence, before such a storage medium can be used in an optical memory system, it must be associated with another medium which will enhance the optical rotating property of the storage medium itself. In accordance with the present invention, it is proposed to enhance the optical rotating property of the ferromagnetic storage medium 12, FIG. 1, by associating with it a magneto-optical medium 14 composed of a transparent ferromagnetic semiconductor, such as a rare-earth chalcogenide or a rare-earth iron garnet, which is maintained at the appropriate temperature for exhibiting ferromagnetic properties.

It is common practice to define the magneto-optical rotating property of a material by a "figure of merit" which measures the amount of Faraday rotation that can be obtained in a sample of the material thin enough to attenuate the transmitted light energy by only one decibel. Inasmuch as the Kerr effect is related to the Faraday effect, both being manifestations of magneto-optical activity, this "figure of merit" likewise affords an indication of the Kerr rotational property. The figure of merit for ferromagnetic metals is very low. For example, iron in its magnetically saturated state has a figure of merit approximately equal to 0.7 degree of rotation per decibel of optical energy loss. On the other hand, a ferromagnetic semiconductor such as EuO, EuS or EuSe may have a figure of merit on the order of 800 degrees of rotation per decibel of optical energy loss, or over one thousand times greater than the figure of merit for iron. This explains why ferromagnetic metals, though excellently suited for the storage of information, are not inherently suited for the magneto-optical readout of such information, their absorption of optical energy being so high that it makes the rotational property of the material unobservable. Thus, while iron or nickel in its magnetically saturated state theoretically could produce a Faraday rotation of visible light as high as 500,000 degrees per centimeter of sample thickness, the absorption of light energy in this material is so great that a thickness of only $10^{-5}$ centimeter such material cannot transmit sufficient light for practical use. On the other hand, a europium chalcogenide in its magnetically saturated state (and at a temperature below its Curie point) can produce a Faraday rotation of 160,000 degrees in a sample one centimeter thick, and as mentioned above, its figure of merit is about 800 degrees/decibel.

In using ferromagnetic semiconductors as magneto-optical rotating media, it is important that the wavelength of the transmitted light be above the "absorption edge" of the material in its magnetically saturated state, assuming that unimpaired transmission of the light is required. Light having wavelengths below the absorption edge will be substantially cut off. The absorption edges of EuO, EuS, and EuSe, for example, are 11,000 A., 7500 A. and 6700 A. respectively. Where a laser is employed as the light source, as herein suggested, it must be capable of furnishing light having a wavelength above the limit imposed by the absorption edge of the particular semiconductor which is being used as the magneto-optical medium.

Figure 6:
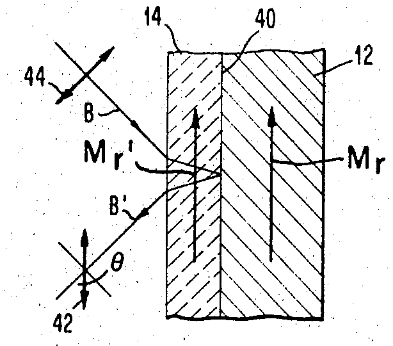
FIG. 6 is a fragmentary sectional view of a magneto-optical data storage device comprising a layer of transparent ferromagnetic semiconducting material in magnetically exchange-coupled relation to a ferromagnetic metallic storage medium in accordance with the principle of the invention.

As shown more clearly in FIG. 6, the storage medium 12 (which may be a permalloy film, for example) has a light-reflecting surface 40 on which is disposed the layer 14 of magneto-optical material. The relationship between the two layers 12 and 14 is sufficiently intimate so that a remanent magnetization vector $M_r$ directed parallel to the surface 40 in any part of the storage medium 12 induces, by exchange coupling, a like magnetization $M_r'$ in the adjacent portion of the magneto-optical medium 14, these two magnetic vectors $M_r$ and $M_r'$ pointing in the same direction parallel with the light-reflecting surface 40. It is assumed that the surface 40 is a substantially smooth surface having high reflectance, as closely as this can be achieved in practice. The transparent magneto-optical layer 14 has low reflectance (for low or moderate angles of incidence) and low absorption so that it transmits the incident light beam B substantially without loss to the light-reflecting surface 40 of the storage medium 12, where the beam is reflected so that it passes back out of the layer 14 to emerge therefrom as the beam B'. The light beam will be refracted slightly as it passes into and out of the layer 14.

The polarization plane of the emergent light beam B', indicated by the arrow 42, FIG. 6, is angularly displaced by an angle $\theta$ from the polarization plane of the incident light beam B, indicated by the arrow 44, due to the combined effect of the similarly orinted magnetization vectors $M_r'$ and $M_r$ in the layers 14 and 12, respectively. The magnitude and sense of this angular displacement depend upon the magnitude and direction of the magnetization vectors in the two layers 12 and 14. Where these two layers are magnetically exchanged-coupled, as in the present instance, with their respective vectors $M_r$ and $M_r'$ pointing in the same direction, the optical rotating effect is comparatively large. The thickness of the transparent layer 14 of ferromagnetic semiconductor may be selected so that an additional enhancement of the magneto-optical rotation by interference effects is obtained also.

FIG. 1 represents, in schematic fashion, the manner in which a magneto-optical memory system can be arranged to utilize the principle of the invention. A source 48 of coherent monochromatic light, such as a laser, furnishes a circularly or elliptically polarized light beam $B_0$, which is passed through a polarizer 50 in order to restrict the polarization of the transmitted light beam B to one plane, say the vertical plane. The linearly polarized light beam B, having oscillations only in the vertical plane, then passes into an electro-optical light deflecting system generally designated 52, FIG. 1, wherein it is selectively deflected by horizontal and vertical electro-optic deflecting devices, controlled by the horizontal and vertical control units 54 and 56, to selected horizontal and vertical positions relative to the data storage apparatus 10. It is understood, of course, that such horizontal and vertical deflections of the linearly polarized beam B would in practice involve various stages of refraction and rotation of the beam by means of well-known instrumentalities such as electro-optic crystals, half-wave plates and the like. Since the specific construction of the light deflecting means 52 is not germane to the present invention, the details thereof are not disclosed herein. Likewise omitted from the present showing are other conventional instrumentalities such as focusing lenses, collimating devices and the like.

The beam B which emerges from the deflecting unit 52 is still (or again) linearly polarized in a given plane (assumed herein to be the vertical plane), and it is directed to a selected bit storage point or cell on the storage matrix 10 for reading the datum representation stored therein. It is evident that the incident light beam B can be caused to scan an entire line of bit storage cells in succession, if this type of operation is desired. The illustrated apparatus is designed to utilize the longitudinal Kerr effect, wherein the incident beam B is reflected from the surface of a magnetic medium 12 that is magnetized parallel to said surface in the plane of incident of the beam B (asumed herein to be vertical). Thus, to recapitulate, the beam B, FIGS. 1 and 6, passes through the magneto-optical layer 14, is reflected from the surface 40 of the storage layer 12, and again passes through the layer 14 to emerge therefrom as the reflected beam B', and in so doing the light beam is subjected to the parallel magnetization vectors $M_r$ and $M_r'$ in the magnetically exchange-coupled layers 12 and 14, respectively, which are oriented in the plane of incidence. The emerging light beam B′ has an elliptical polarization in which the major axis is much larger than the minor axis, so that for practical purposes the beam B′ may be viewed as having a linear polarization in the plane of the major axis. The final polarization plane, represented in FIG. 6 by the arrow 42, is angularly displaced by angle $\theta$ from the initial polarization plane, represented by the arrow 44, the magnitude and sense of the displacement angle $\theta$ being determined by the magnitude and sense of the magnetization vectors $M_r$ and $M_r'$.

To detect the polarization shift experienced by the light beam as it is reflected from a selected part of the magneto-optical storage matrix 10, an analyzer is arranged in the path of the emerging beam B′. The analyzer 58 is arranged to transmit, substantially without loss of energy, a beam that is polarized in a plane displaced from the vertical by a given angle $\theta$. Such a beam B′, in passing through the analyzer 58, will be detected by the light-sensitive device 60, which thereupon furnishes an appropriate output signal. If the beam B′ is not suitably polarized, indicating the absence of a stored datum representation of a type which the system is adapted to detect, the analyzer 58 then will transmit insufficient radiant energy to activate the detector 60.

In summary, the present invention contemplates the provision of a two-layer magneto-optical memory element 10 in which a ferromagnetic storage layer 12 is magnetically exchange-coupled to a transparent ferromagnetic semiconductive layer 14. As the most practical embodiment of the invention, it is proposed that the storage layer be a fairly thick ferromagnetic film for storing a relatively large amount of magnetization, which means that it must be opaque. Hence, the Faraday effect cannot be utilized, and the longitudinal Kerr effect is employed instead. The magnetic exchange-coupling relationship between the two layers 12 and 14 greatly enhances the Kerr rotational effect and is considered to be a distinctive feature of the present invention.

Figure 7:
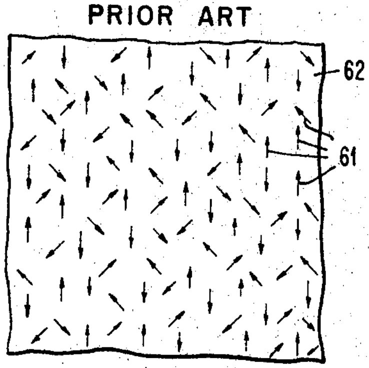
FIG. 7 PRIOR ART
FIG. 7 is a diagrammatic representation of a paramagnetic material while the same is in a demagnetized state.
Figure 8:
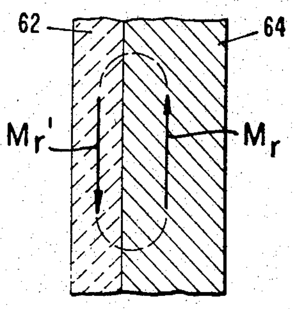
FIG. 8 is a fragmentary sectional view of a prior magneto-optical device comprising a layer of transparent paramagnetic material in magnetostatically coupled relation to a ferromagnetic storage medium.

In order to provide exchange coupling between two layers, such as 12 and 14, it is necessary that both layers be ferromagnetic. A paramagnetic material such as cerium glass wherein the magnetic moments tend to be oriented in completely random fashion without the formation of any magnetic domains therein as shown in FIG. 7, will not fulfill the requirements for exchange coupling. Referring to FIG. 8, if a layer 62 of paramagnetic material is positioned adjacent to a layer 64 of ferromagnetic material, regardless of how intimately the two layers are associated with each other, the only magnetic coupling that can exist between the two layers in a magnetostatic or strayfield coupling in which the respective magnetization vectors $M_r$ and $M_r'$ of the two layers are antiparallel to each other. This type of magnetic coupling produces a Kerr rotational effect that is generally considered insignificant for practical use. The present invention affords a superior mode of opeartion in which the Kerr magneto-optical effect can be enhanced to a degree not possible in prior magneto-optical devices.

When a europium chalcogenide is used as the transparent ferromagnetic medium 14, such a material must be maintained at a temperature below its Curie point, which is in the cryogenic temperature range. Typical Curie points for such materials are 72° K. for EuO, 19° K. for EuS and 7° K. for EuSe. If a garnet is used as the magneto-optical medium 14, it must be maintained at a temperature that is (1) below its Curie point (around 500° K.) and (2) substantially different from its compensation temperature (around 287° K. for a gadolinium iron garnet without additives). The storage medium 12 likewise must be maintained below its Curie point, which is around 1000° K. for permalloy. For the purpose of comparison, normal room temperature is round 293° K. (68° F.).

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magneto-optical memory element which is adapted to be sensed by a linearly polarized light beam in a manner such that the magnetic state of said element determines the angular position assumed by the polarization plane of said light beam, said memory element comprising:

a first layer of ferromagnetic material capable of assuming a state of remanent magnetization in a given direction substantially parallel to at least one surface thereof for thereby storing a selected datum representation, a second layer of ferromagnetic material disposed adjacent to said first layer and capable of assuming a state of remanent magnetization which has a magnetically exchange-coupled relationship with the remanent magnetization of said first layer in said given direction thereby to establish a corresponding magnetization of said second layer in substantially the same direction, at least one of said layers being transparent to permit the passage of said light beam through it to the other layer, and electrically operable writing means for selectively magnetizing adjoining portions of said two layers is substantially the same direction parallel with the adjacent surfaces of said layers, thereby to induce a magnetically exchange-coupled relationship of said layers as described.

2. A magneto-optical memory element as set forth in claim 1 wherein said transparent layer is a semiconductive material having ferromagnetic properties.

3. A magneto-optical memory element which is adapted to be sensed by a linearly polarized light beam in a manner such that the magnetic state of said memory element determines the angular position assumed by the polarization plane of said light beam, said memory element comprising:

a ferromagnetic data storage medium having a surface thereof adapted to reflect said light beam and capable of assuming a state of remanent magnetization in a given direction substantially parallel to said surface for thereby storing a selected datum representation, a transparent ferromagnetic medium disposed adjacent to said light-reflecting surface in a magnetically exchange-coupled relationship with said storage medium for enabling the remanent magnetization of said storage medium in said given direction to establish a corresponding magnetization of said transparent medium in substantially the same direction, whereby the rotational effect of the first-mentioned magnetization upon said light beam is enhanced by the rotational effect of the second-mentioned magnetization thereon, and electrically operable writing means for causing adjoining portions of said two media to be magnetized in substantially the same selected direction parallel with said surface.

4. A magneto-optical memory element as set forth in claim 3 wherein said transparent ferromagnetic medium is rare-earth chalcogenide maintained at a temperature substantially below its magnetic Curie temperature.

5. A magneto-optical memory element as set forth in claim 4 wherein said transparent ferromagnetic medium is selected from the group comprising europium oxide, europium sulfide, europium selenide and europium telluride.

6. A magneto-optical memory element as set forth in claim 3 wherein said transparent medium is a ferrimagnetic material maintained at a temperature substantially different from its magnetic compensation temperature and substantially below its magnetic Curie temperature.

7. A magneto-optical memory element as set forth in claim 6 wherein said transparent medium is a rare-earth iron garnet.

References Cited

UNITED STATES PATENTS

| | | | |
|---|---|---|---|
| 3,164,816 | 1/1965 | Chang et al. | 340—174 |
| 3,167,751 | 1/1965 | Kelner et al. | 340—174.1 |
| 3,174,140 | 3/1965 | Hagopian et al. | 340—174.1 |

OTHER REFERENCES

Journal of Applied Physics, "Magneto-Optical Readout From a Magnetized Nonspecular Oxide Surface" by Supernowicz, vol. 34, #4 (part 2), April 1963.

IBM Technical Disclosure Bulletin, "Optical Readout Using Europium Fluoride" by Shafer et al., vol 8, #7, December 1965.

STANLEY M. URYNOWICZ, Jr., Primary Examiner

U.S. Cl. X.R.

340—174.1; 350—151